United States Patent [19]

Inoue et al.

[11] Patent Number: 4,915,349

[45] Date of Patent: Apr. 10, 1990

[54] GAS GOVERNOR APPARATUS AND GAS PIPING SYSTEM

[75] Inventors: Tomoaki Inoue, Mito; Yoshiaki Chiba, Hitachi; Kazuhiko Kawaike; Seishi Watahiki, both of Katsuta; Shinji Sonoda, Hitachi, all of Japan

[73] Assignee: Hitachi, Ltd., Tokyo, Japan

[21] Appl. No.: 280,934

[22] Filed: Dec. 7, 1988

[30] Foreign Application Priority Data

Dec. 9, 1987 [JP] Japan ................................ 62-309631

[51] Int. Cl.$^4$ ...................... F16K 31/04; G05D 16/00
[52] U.S. Cl. ............................ 251/129.03; 251/129.11; 137/487.5; 137/454.6
[58] Field of Search ............... 137/454.6, 454.2, 487.5; 251/129.11, 129.03

[56] References Cited

U.S. PATENT DOCUMENTS

| | | | |
|---|---|---|---|
| 4,503,878 | 3/1985 | Taylor | 137/454.6 X |
| 4,503,884 | 3/1985 | Spils | 137/454.6 X |
| 4,723,753 | 2/1988 | Torimoto et al. | 251/129.11 X |

*Primary Examiner*—Arnold Rosenthal
*Attorney, Agent, or Firm*—Antonelli, Terry & Wands

[57] ABSTRACT

A gas governor apparatus comprises an inner casing removably mounted on an outer casing. Further, a driving mechanism for driving a valve body to control pressure and flow rate of fluid between the valve body and a valve seat formed in the inner casing comprises a drive motor and a drive shaft. The drive shaft has a dual drive sleeve construction where an outer drive sleeve and the valve body are constituted as a rotating drive mechanism and an inner drive sleeve and the outer drive sleeve are constituted as an axial shifting drive mechanism. The outer and inner drive sleeves are axially shiftable by means of an elastic member. The valve body and the inner casing are maintained sealingly by dual expansible members. A flow passage is defined by the dual expansible members and the inner casing. An intermediate pressure chamber is switched to communicate with one of a primary pressure circuit communicating to primary pressure and a secondary pressure circuit communicating to secondary pressure by means of a three-way switching valve to permit introduction of the fluid into the intermediate pressure chamber.

11 Claims, 8 Drawing Sheets

GAS GOVERNOR APPARATUS AND GAS PIPING SYSTEM

BACKGROUND OF THE INVENTION

The present invention relates to a gas governor apparatus and a gas piping system, and, more particularly, it relates to a gas governor apparatus suitable to regulate pressure of and control a flow rate of fluid in a piping installation for city gas and the like, and a gas piping system for effectively arranging such gas governor apparatus.

In conventional governor apparatus for regulating pressure of fluid such as city gas, as self-operated governor apparatuses, an apparatus comprising a diaphragm and a weight as disclosed in Japanese Patent Laid-Open No. 54-73327, and an apparatus comprising a pilot regulator and a sanders valve utilizing a rubber sleeve as disclosed in Japanese Patent Laid-Open No. 52-105330 have widely been used. Further, as direct drive governor apparatus, an apparatus comprising an outer casing, an inner casing and a screw mechanism, or an electronic governor apparatus wherein a valve is controlled by a solenoid and the like as disclosed in Japanese Patent Laid-Open No. 58-178115, or an apparatus comprising wherein a valve is driven through a screw mechanism by a drive source including a motor as disclosed in Japanese Patent Laid-Open No. 61-201972 has been used.

In addition, as a governor apparatus utilizing a shut-off valve, an apparatus comprising a cylinder and a spring and hydraulic pressure as disclosed in Japanese Patent Laid-Open No. 58-683 has been used.

However, in the conventional self-operated governor apparatuses, the former apparatus (as disclosed in Japanese Patent Laid-Open No. 54-73327), a governor body has double ports and a secondary pressure regulating mechanism is constituted by an intermediate pressure secondary governor, a low pressure secondary governor and an auxiliary ball including a diaphragm, and fluid pressure is adjusted by applying the weight onto a lever interconnected between the auxiliary ball and a main governor. While this governor apparatus provides a stable pressure regulation, such governor apparatus has disadvantages that an operating portion thereof is heavy, operation speed thereof is slow and the installation thereof requires a large space since the volume of the ball is large. On the other hand, in the latter apparatus (as disclosed in the japanese Patent Laid-Open No. 52-105330), a governor has a simple construction formed by assembling a pair of slitted frusto-conical grids in opposed relation and by covering a rubber sleeve onto the assembled grids and secondary pressure is controlled by a pilot regulator. While this governor apparatus has advantages that it is compact, light-weighted and noiseless, such apparatus has disadvantages that there is greater loss of pressure since the gas must push up the rubber sleeve when it flows and that the apparatus cannot be operated sufficiently when the difference between the primary pressure and the secondary pressure is small. Further, if the rubber sleeve is damaged, the apparatus will be unable to control. Further, in the conventional direct drive governor apparatus, it comprises the outer casing and the inner casing, a driving motor and a driving shaft are arranged within the inner casing, screw mechanisms are provided for a driven shaft and a valve body, and a flow passage is provided between the outer casing and the inner casing. While this governor apparatus has an advantage that it is compact and light-weighted, and that there is little loss of pressure, and that it is possible to adjust the pressure with high accuracy at high speed, such apparatus has disadvantages that, when fluid, other than the city gas, whose secondary pressure is higher than atmospheric pressure is controlled, the power consumption in the driving means is increased since a thrust force generated therein is not negligible. Further, if a driving system is troubled, since there is no provision of means for shutting-off the gas, energy shut-off valve must be further provided, with the result that a larger space is required for installation of the whole system.

On the other hand, the shut-off valve is structured to shut off the fluid by sliding the cylinder with utilizing the fluid pressure and has only a function to shut-off the fluid. It does not have a function to control the fluid pressure. Further, a case that the fluid is corrosive is not considered.

SUMMARY OF THE INVENTION

Accordingly, an object of the present invention is to provide a gas governor apparatus and a gas piping system in which maintenance and inspection thereof can be easily performed.

Another object of the present invention is to provide a gas governor apparatus and a gas piping system which can safely and quickly shut off a flow passage even when a valve body cannot be operated due to mechanical damage, and can control fluid pressure in a wide range with high accuracy at high speed and can reduce the power consumption.

According to the present invention, there is provided a gas governor apparatus comprising an outer casing fixed to a piping structure, an inner casing received into the outer casing, a valve body slidably supported by the inner casing, for controlling pressure and flow rate of fluid between the valve body and a valve seat provided in the inner casing, and driving mechanism for driving the valve body, the inner casing being removably mounted to the outer casing.

In the present invention, since the inner casing assembled together with the valve body and the driving mechanism can be removed without decomposing a junction between the outer casing and the piping structure, maintenance and inspection of the valve body and the driving mechanism can be easily performed. Further, since the fluid pressure acting on the valve body is balanced, the power consumption regarding the driving mechanism can be reduced.

In addition, according to the present invention, there is provided a gas piping system comprising a valve means for directing city gas supplied from a gas piping to a gas governor apparatus through a filter, for supplying the city gas to a supply source after the city gas is adjusted to have appropriate pressure, and for stopping the supply of the city gas to the governor apparatus during maintenance and/or inspection; and a bypass circuit capable of supplying the city gas adjusted to have appropriate pressure to the supply source even when the supply of the city gas by means of the valve means is stopped; the gas governor apparatus having a shut-off function for shutting off a flow passage when the governor apparatus is in an abnormal condition and a metering function as a flowmeter for recording volume of the used city gas.

In the present invention mentioned above, even when the fluid pressure is unable to control due to a mishap to the driving system and the like, by changing over the pressure in an intermediate pressure chamber, it is possible to shut off the flow passage, thus eliminating the provision of an additional isolation valve. Further, since the governor apparatus has both shut-off function and the metering function, additional isolation or shut-off valve and flowmeter are not needed, thereby reducing a space of installation thereof.

DETAILED DESCRIPTION OF THE PREFERRED EMBODIMENTS

The present invention will now be explained in connection with the accompanying drawings.

Figure 1:
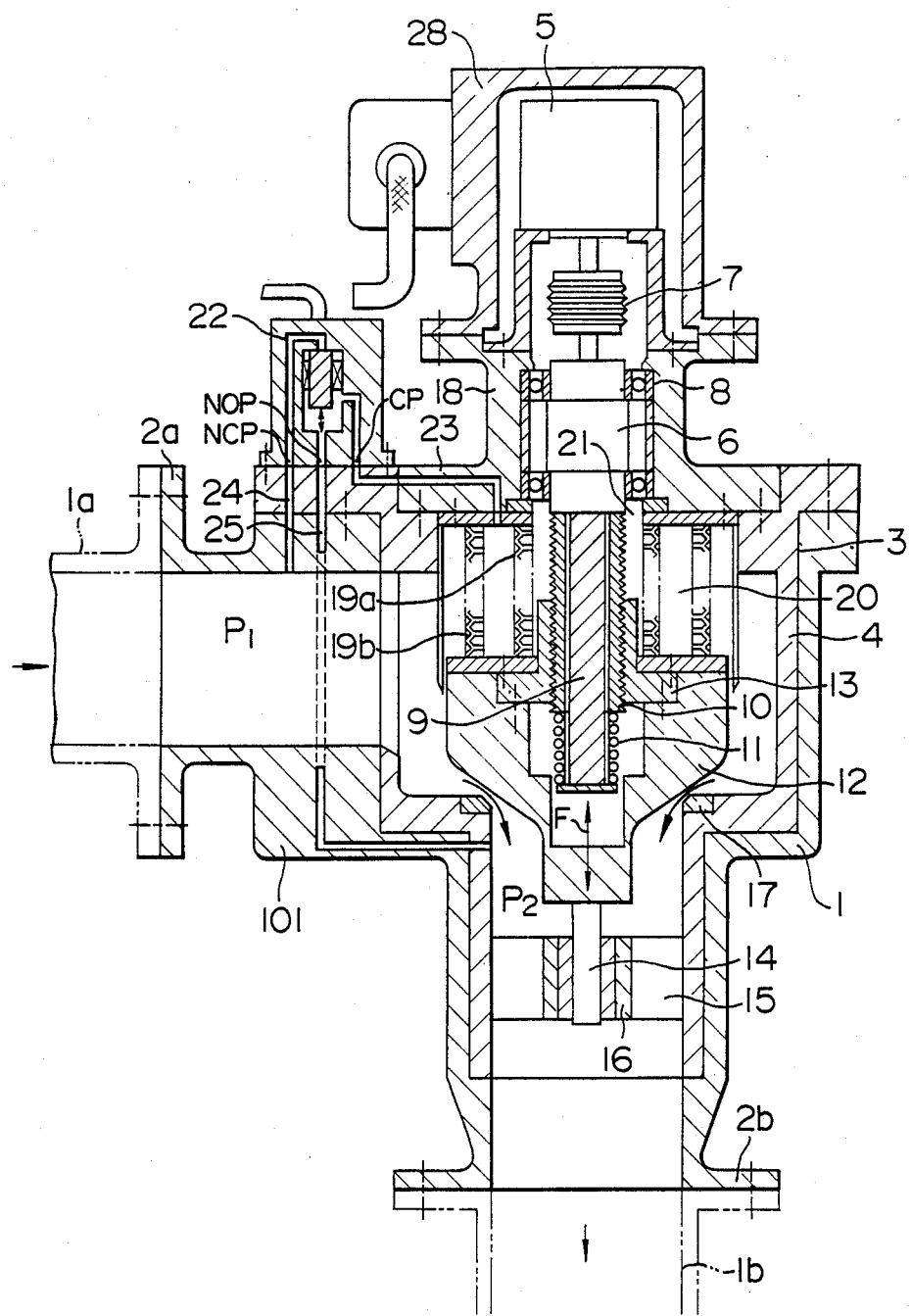
FIG. 1 is a longitudinal sectional view of a gas governor apparatus according to a preferred embodiment of the present invention.

FIG. 1 shows a gas governor apparatus according to an embodiment of the present invention. The illustrated gas governor apparatus is generally constructed as follows: a generally L-shaped outer casing 1 of a governor is fixed to a primary piping 1a and a secondary piping 1b by means of flanges 2a and 2b, respectively. The governor outer casing 1 is provided at its upper end with an opening 3 through which a governor inner casing 4 is removably mounted within the outer casing to form a sealed dual construction together with the outer casing 1. A drive motor 5 is received in a motor case 28 fixed to the governor inner casing 4 through a bearing case 18 and is connected to a drive shaft 6 through a coupling 7. The drive shaft 6 is supported by two ball bearings 8 and is provided at its one end with a spline shaft 9. A threaded shaft 10 is arranged around the spline shaft 9 and connected thereto by means of a coil spring 11 in such a manner that the threaded shaft 10 can be rotated together with the spline shaft 9 and is axially slidable relative to the spline shaft due to spline connection between the shafts 9 and 10. The threaded shaft 10 cooperates with a nut 13 provided in a valve body 12 to convert rotational movement of the drive shaft 6 into linear movement, thereby driving the valve body 12. In addition, a guide shaft 14 is attached to a lower end of the valve body 12 and is guided in a guide bearing 16 fixed to the inner casing 4 through ribs 15, thus shifting the valve body 12 whereby fluid pressure is controlled between the valve body 12 and a valve seat 17 fixed in the inner casing 4.

On the other hand, a dual expansible members 19a and 19b are mounted between the valve body 12 and the bearing case 18 for securing the ball bearing 8 so as to shut off the primary fluid pressure and to seal, by the expansible member 19a, both an intermediate pressure chamber 20 defined between the expansible members 19a and 19b, and a drive chamber 21 for receiving a driving system (comprising the drive motor 5, coupling 7, drive shaft 6, spline shaft 9, threaded shaft 10 and nut 13). A pressure communication passage 23 for communicating the intermediate pressure chamber 20 with a common port CP for a pressure switching valve 22 attached to the inner casing 4 is formed in the bearing case 18 and in the inner casing 4. Further, similarly, a primary pressure P1 and a secondary pressure P2 are communicated with an NC port NCP and an NO port NOP of the switching valve 22 through primary and secondary communication passages 24 and 25 formed in the outer and inner casings 1 and 4, respectively.

Since the valve body 12 and the driving mechanism such as the drive motor 5, drive shaft 6 and the like are fixedly mounted on the governor inner casing 4, when the maintenance and/or inspection of the apparatus is performed, only by drawing the inner casing 4 out of the opening 3 of the outer casing 1, the valve body 12 and the driving mechanism can also be removed from the outer casing, thus facilitating the maintenance and/or inspection.

Next, principle of operation of the gas governor apparatus according to the present invention will be explained.

The fluid from the primary piping 1a flows into the governor and the fluid pressure is regulated between the valve body 12 and the valve seat 17, and thereafter, the fluid flows in a direction shown by an arrow. When the secondary pressure P2 varies with respect to a set value, a signal corresponding to the deviation of the pressure is sent to the drive motor 5 from an external control circuit (not shown), thus rotating the drive motor 5. When the drive motor 5 is rotated, the drive shaft 6 connected to the drive motor is also rotated, thereby shifting the valve body 12 in an up-and-down direction through the spline shafts 9, 10, thus changing the clearance between the valve body 12 and the valve seat 17 so as to control the flow rate of the fluid until the secondary pressure P2 returns to its set value. In this case, the valve body 12 can be shifted without rotation by means of the guide bearing 16 and the vibration of the valve body due to the fluid pressure is also prevented.

By the way, the governor apparatus for the city gas and the like must be operated even if the electric current or supply is interrupted; thus, the apparatus is usually backed up by a battery (not shown) as a countermeasure for the interruption of the electric current. Therefore, in order to stably operate the governor apparatus even when the electric current is interrupted for a long time, it is desirable to use a drive motor which power consumption is considerably little. The capacity of the motor is determined by a load torque $T_L$ and an acceleration torque Ta. That is to say, the motor demand torque Tm is represented by the following equations:

$$Tm = Ta + t_L \quad (1)$$

$$Ta = (Jm = J_L) \times \dot{\omega} \quad (2)$$

Here, Jm is a moment of inertia of the motor shaft, $J_L$ is a moment of load inertia, $\dot{\omega}$ is an angular acceleration.

Accordingly, the smaller the load torque $T_L$ and the acceleration torque Ta, the less the capacity of the motor. Among them, the moments of inertia Jm and $J_L$ for determining the acceleration torque Ta are minimized by directly connecting the drive motor 5 to the drive shaft 6 without intermediate gearing. Further, as to the load torque $T_L$, in the illustrated embodiment, a ball screw is adopted as the screw mechanism, with the result that, since the coefficient of friction thereof is in the order of 0.01 and is constant, the load torque can be determined by the thrust force F acting on the valve body 12. Therefore, it is desirable that the thrust force F does not act on the valve body 12; thus, in the embodiment shown in FIG. 1, the thrust force F is reduced in the following manner:

That is to say, in FIG. 1, the dual expansible members 19a and 19b are arranged between the bearing case 18 and the valve body 12, and the secondary pressure P2 is introduced into the intermediate pressure chamber 20 defined between the expansible members 19a and 19b through the secondary pressure communication passage 25 and the pressure communication passage 23.

Here, technical meanings of adoption of such construction will be explained with reference to FIGS. 2 and 3.

Figure 2:
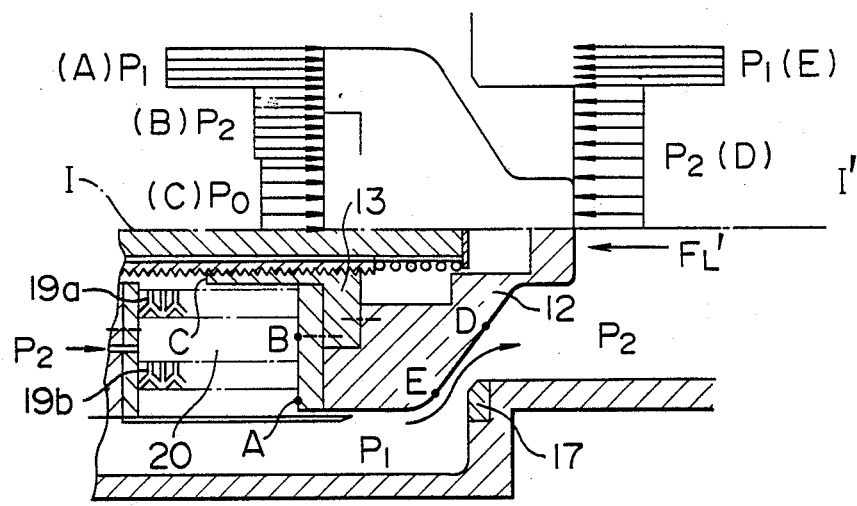
FIGS. 2, 3 and 4 are views showing distribution of fluid pressure acting on a valve body when a shut-off function is activated in the governor apparatus of FIG. 1.
Figure 3:
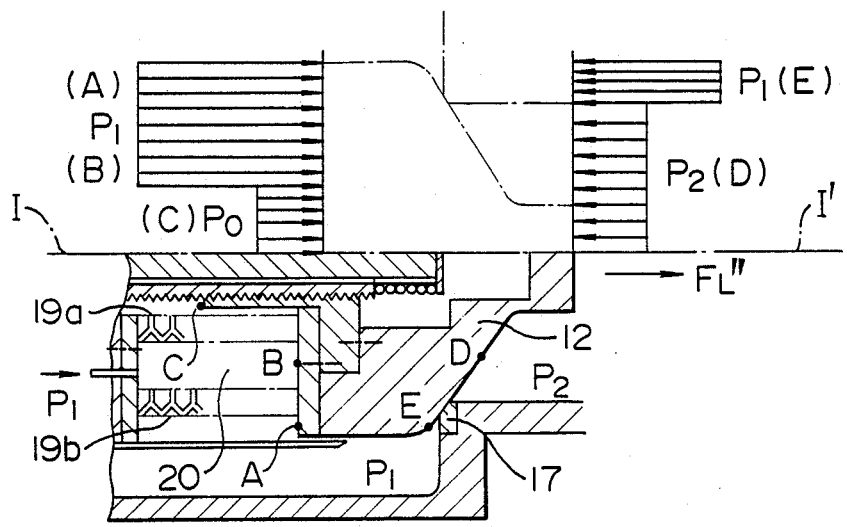

FIGS. 2 and 3 show the valve body 12 and portions associated therewith. Further, in these drawings, a lower half regarding a central axis I—I' of the valve body 12 shows the actual constructional elements, and an upper half regarding the central axis I—I' shows distribution of pressure acting on the constructional elements As apparent from these drawings, the primary pressure P1 acts on the outside A of the outer expansible member 19b, the secondary pressure P2 acts on the inside B of the intermediate pressure chamber 20, and an atmospheric pressure Po acts on a portion C of the nut 13 and the like, respectively, so as to bias the valve body to its closed position. On the other hand, the secondary pressure P2 acts on a portion D of the outer periphery of the valve body 12 and the primary pressure P1 acts on a portion E of the outer periphery of the valve body, respectively, so as to bias the valve body to its opened position. Accordingly, since the pressure having the same value and acting in opposite directions do not create the thrust force, the pressure difference (P2−Po) is created on a portion of the areas C and D, and, thus, the valve body 12 is subjected to the thrust force $F_L$, in the valve opening direction as represented by the following equation (3):

$$F_L' = (P2 - Po) \cdot A1 \quad (3)$$

Here, A1 is a cross-sectional area between the central axis I—I' and the inner expansible member 19a.

By the way, in case of the city gas and the like, since the secondary pressure P2 of the lower pressure governor is higher than the atmospheric pressure Po by about 0.005–0.025 kgf/cm², thus, the pressures P2 and Po can be regarded as the same. Therefore, in the equation (3), the value $F_L'$ is negligible, and accordingly, the load torque $T_L$ can be minimized. Accordingly, the capacity of the motor may be selected to match the required acceleration torque Ta (the above equation (2)), thus minimizing the power consumption.

Incidentally, in FIG. 1, if there is no inner expansible member 19a, since the pressure acting on the area C becomes P2 to lead $F_L'=0$, the load torque will be zero ($T_L=0$). However, since the city gas and the like is inflammable, even when a brushless motor is used as the drive motor, there is a risk of explosion due to rare short of coils and/or wirings, and when the used fluid is corrosive, there is a risk of damage of the driving system; but, such problems can be solved by providing the dual construction of the expansible members as in the present invention.

Incidentally, the outer expansible member 19b is indispensable to reduction of the thrust force F. If there is no provision of the expansible member 19b (accordingly, there is also no intermediate pressure chamber 20), the primary pressure P1 will act on the areas A and B, thus generating the larger thrust force F corresponding to (P1−P2) and acting in the valve closing direction. Thus, in this case, the valve body 12 must be opened or closed against such thrust force, with the result that it is required to prepare the larger battery.

The technical effect for minimizing the drive motor as explained in connection with FIG. 2 is attained by providing at least the outer expansible member 19b and by introducing the secondary pressure P2 into the intermediate pressure chamber 20 through the secondary pressure communication passage 25, No port NOP, common port CP and pressure communication passage 23, with the result that, in a normal condition wherein the NO port is opened and the NC port is closed, the valve body 12 is merely subjected to the small thrust pressure P in the valve opening direction. In the normal condition wherein the driving power soruce (not shown) for the drive motor 5 is activated, there is no problem if the small thrust pressure acts in the valve opening direction; however, it is not desirable to create such thrust force in taking account of the failure of the drive motor. In order to improve the security of the apparatus, it is preferable to positively close the valve when the drive motor is troubled.

In this connection, according to the present invention, the abnormity of the drive motor can be detected by, for example, the fact that the clearance between the valve body and the valve seat is not reduced even when the secondary pressure P2 is increased. Consequently, the NO port NOP of the pressure switching valve 22 is closed and the NC port NCP is opened, thus introducing the primary pressure P1 into the intermediate pressure chamber 20 through the primary pressure communication passage 24, NC port NCP, common port CP and pressure communication passage 23. In this case, the distribution of the pressure acting on the areas of the valve body is in the condition shown in FIG. 3, and thus, the direction and magnitude of the thrust force are determined by the pressure difference acting on the area B of the intermediate pressure chamber 20.

That is to say, when the pressure switching valve 22 is activated, the pressure in the intermediate pressure chamber 20 becomes the primary pressure P1, an the valve body 12 will be subjected to a thrust force in the valve closing direction, as represented by the following equation:

$$F_L'' = (P_1 - P_2) \cdot A_2$$

Here, $A_2$ is a cross-sectional area of the intermediate pressure chamber 20. Consequently, the thrust force $F_L''$ acts on the threaded shaft 10 through the nut 13 fixed to the valve body 12 to urge the valve body 12 on the valve seat 17 against the force of the coil spring 11, thus shutting off the fluid. Therefore, even when the drive shaft 6 and/or the drive motor 5 is troubled, the shut-off is certainly performed and the security of the apparatus is ensured. Further, since the operating fluid does not enter the drive chamber 21, the driving system is not influenced upon the failure of the drive motor and the like.

Figure 4:
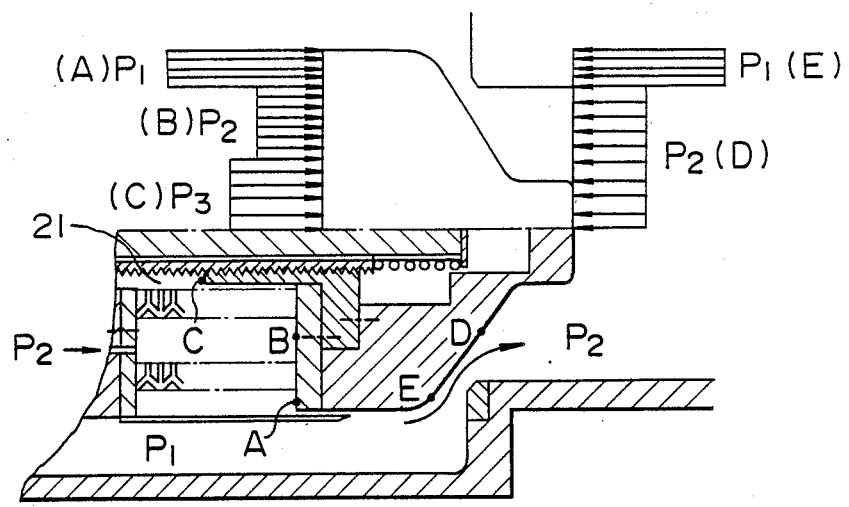

In addition, FIG. 4 shows the distribution of pressure when inert gas is filled in the drive chamber 21. In this embodiment, the pressure $P_3$ of the inert gas introduced into the drive chamber 21 is set to a value slightly higher than the secondary pressure $P_2$ and lower than the primary pressure $P_1$. By setting the pressures in this way, even when the secondary pressure $P_2$ is higher than the atmospheric pressure $P_o$, the thrust forces acting on the valve body are substantially balanced; and, since the pressure $P_3$ in the drive chamber 21 is higher than the secondary pressure $P_2$, evne if the expansible member 19a is damaged to unseal with respect to the operating fluid, the operating fluid cannot enter the drive chamber 21; thus, by always monitoring the pressure in the drive chamber 21, the abnormity of the expansible members 19a and 19b can be prematurely detected, thereby improving the security of the apparauts.

Figure 5:
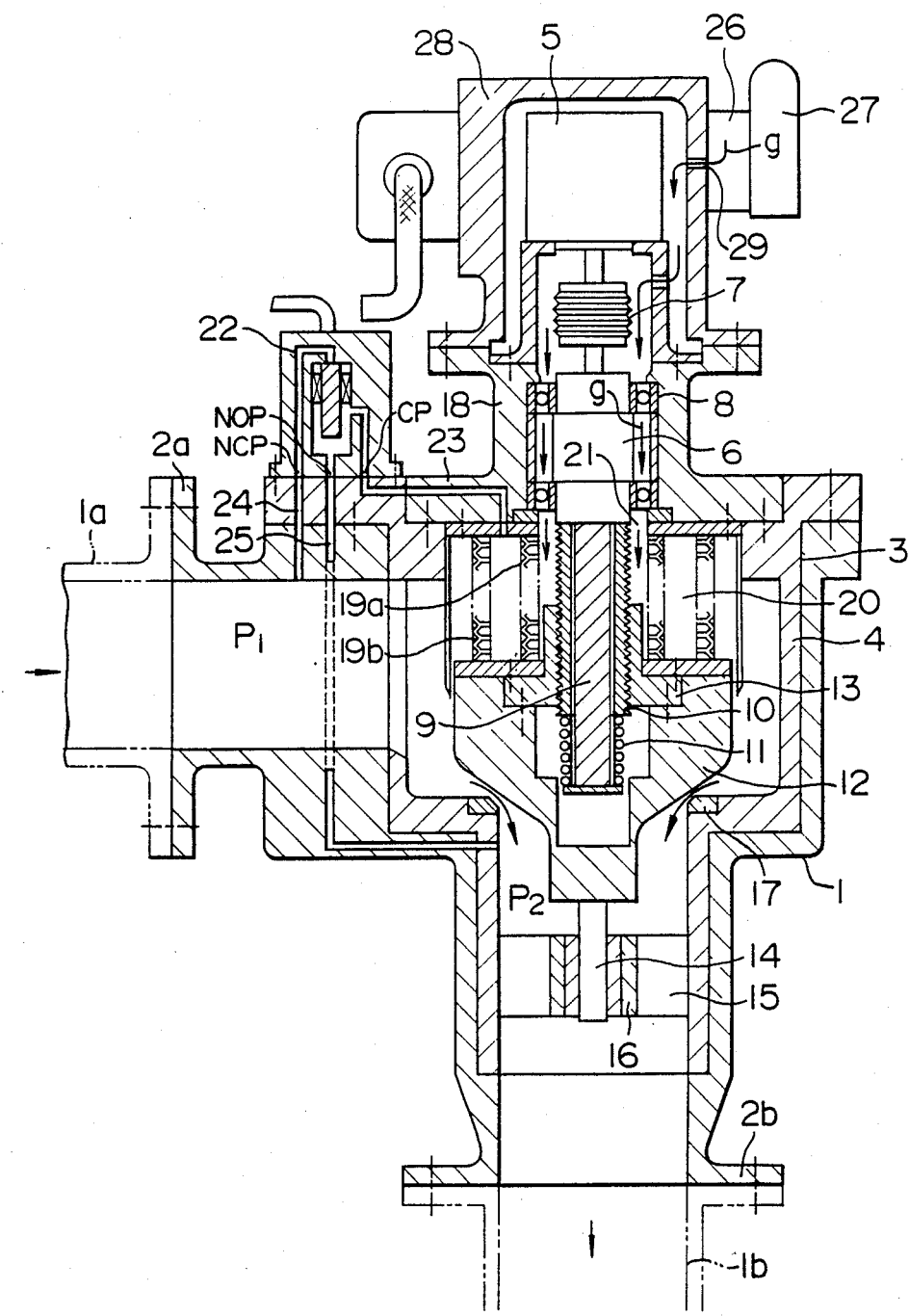
FIG. 5 is a longitudinal sectional view of a gas governor apparatus according to another embodiment of the present invention.

Next, FIG. 5 shows another embodiment of the present invention. In this embodiment, a solenoid valve 26 is added, and a high pressure source 27 and a high pressure communication passage 29 for communicating the high pressure source 27 with the drive chamber 21 are further provided.

Figure 6:
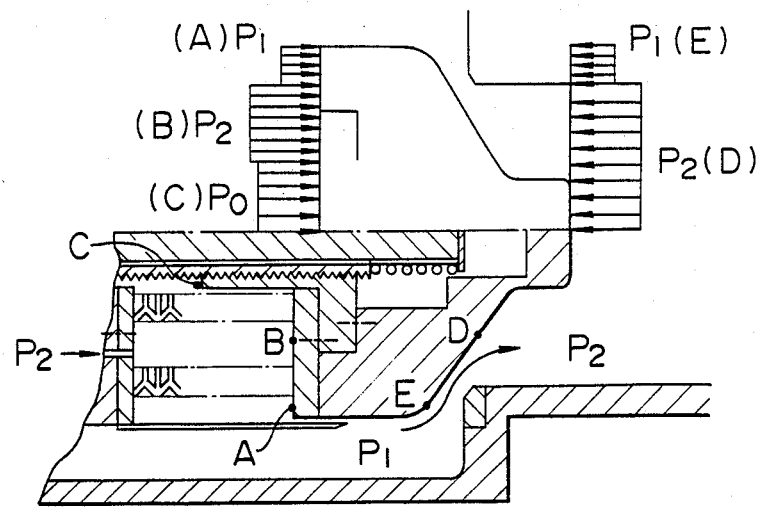
FIGS. 6 and 7 are views showing distribution of fluid pressure acting on a vlave body when a shut-off function is activated in the gas governor apparatus of FIG. 5.
Figure 7:
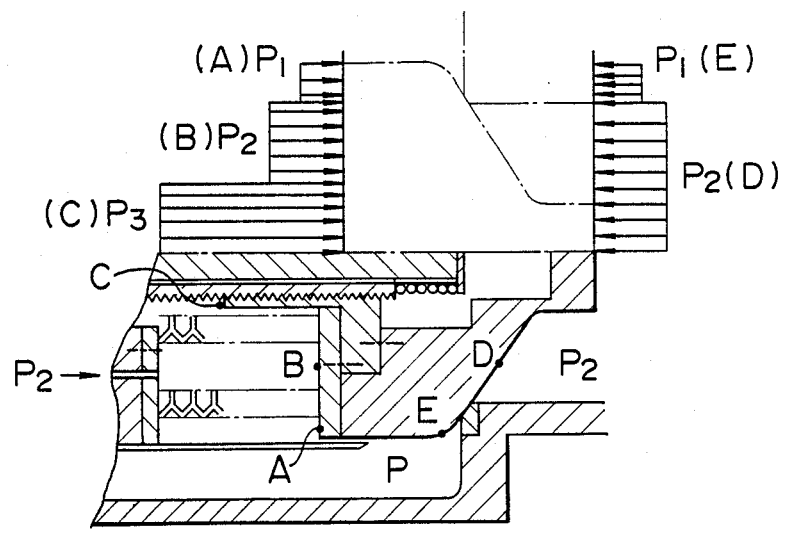

In the embodiment shown in FIG. 1, even if the primary pressure $P_1$ is lowered below the secondary pressure $P_2$, since the thrust forces acting on the valve body 12 are balanced as shown in FIG. 6, it is possible to close the governor reasonably by driving the valve body 12 by means of the small capacity drive motor 5; however, in this condition, when the driving system is also troubled, the shut-off function cannot be activated, and thus, the governor cannot be closed. Even in such a case, in order to activate the shut-off function, according to the embodiment shown in FIG. 5, high pressure inert gas is introduced into the drive chamber 21 through the solenoid valve 26. FIG. 7 shows the distribution of pressure acting on the valve body 12 in that condition. As apparent from FIG. 7 by introducing the inert gas having the pressure corresponding to shut-off force into the drive chamber 21, it is possible to shut off the governor in all cases. On the other hand, if an atmospheric air is introduced into the drive chamber 21, since the air in the drive chamber 21 is heated by the heat of the drive motor 5 whereas the motor case 28 is cooled by the surrounding air, when the heated air in the drive chamber 21 encounters the motor case 28, water drops are formed on the motor case, thus causing the risk of damaging the driving system. In the embodiment of FIG. 5, such risk can be eliminated introducing the moistureless inert gas into the drive chamber.

Figure 8:
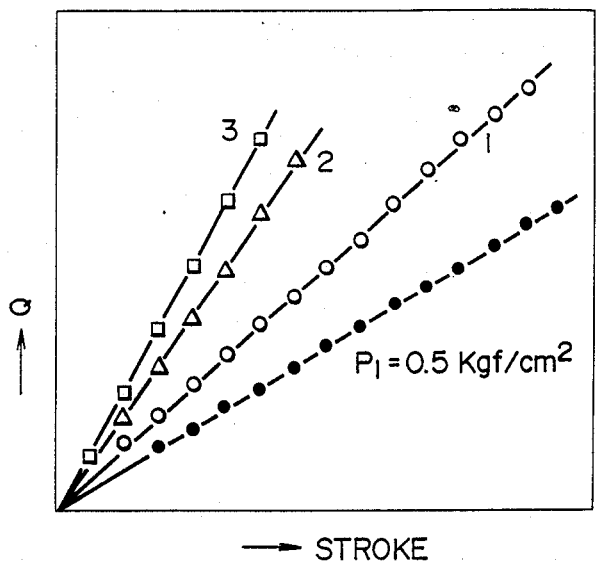
FIG. 8 is a characteristic graph showing the relation between a stroke of the governor and a flow rate in the illustrated gas governor apparatus.
Figure 9:
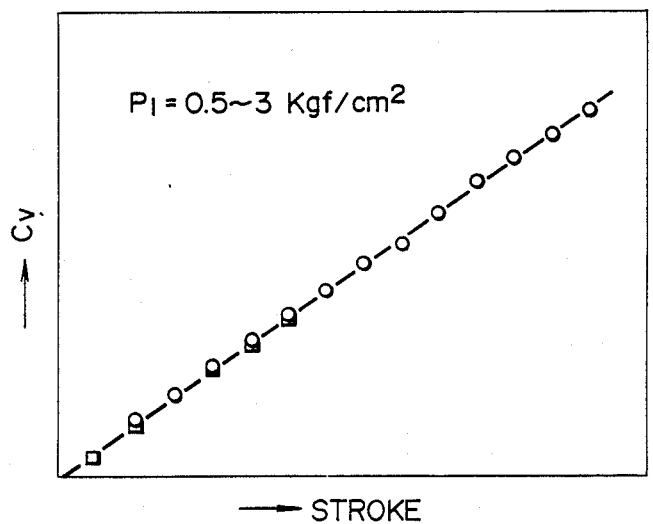
FIG. 9 is a characteristic graph showing the relation between the feature of the valve (Cv) and the stroke by rearranging the feature of FIG. 8.

FIG. 8 shows a relation between a stroke of the governor according to the present invention and a flow rate, obtained by tests with the primary pressure $P_1$ as a parameter. As seen from FIG. 8, the flow rate is always proportional to the stroke under any primary pressure; this means that the governor according to the present invention can serve as a flowmeter. Such characteristic or feature is obtained due to the fact that the secondary flow passage is formed linearly to minimize loss of pressure. FIG. 9 shows a relation between the Cv value and the stroke, which is usually used to show the feature of the valve, by arranging the relation shown in FIG. 8. That is to say, when the flow rate is represented by Q, the specific weight of the gas to air is represented by G, and the proportional constant is represented by K, the following relation can be obtained:

$$C_v = Q/(K \cdot P_1) \cdot \sqrt{G}$$

Accordingly, by detecting the stroke and the primary pressure, it is possible to measure the flow rate of the fluid. Consequently, it is possible to reduce the space for installation of the various elements for the city gas.

Figure 10:
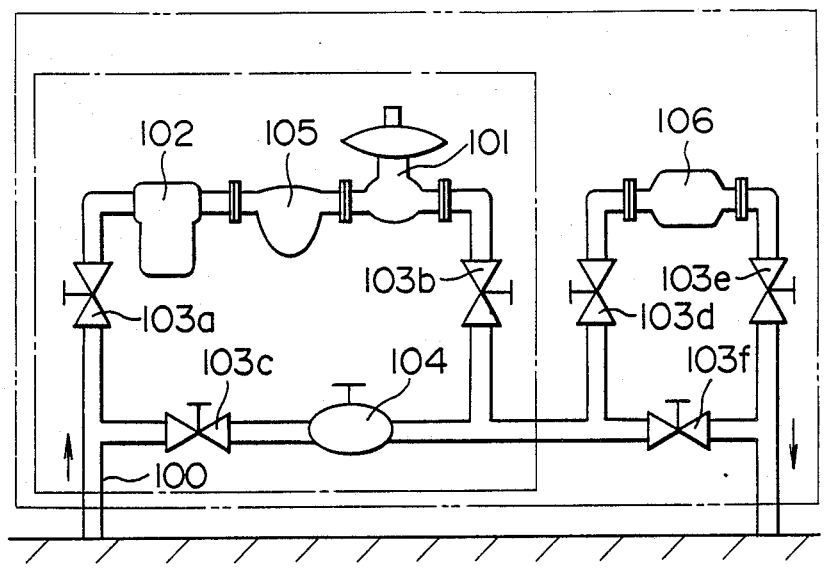
FIG. 10 is a schematic constructional view showing a conventional gas piping system installed in a building or a home.

FIG. 10 shows a conventional gas piping system for the city gas and the like. A block shown by a dot-and-line shows a district governor piping system for popular homes, wherein the city gas is supplied from an intermediate pressure pipe 100 through a manual valve 103a, filter 102, shut-off valve 105, gas governor apparatus 101 and manual valve 103b, and a manual valve 103c and a gas governor apparatus 104 are arranged in a bypass circuit for inspection.

On the other hand, a block shown by two dots-and-line designates an exclusive governor piping system for buildings and the like. This exclusive governor piping system includes a flowmeter 106 in addition to the afore-mentioned district governor piping system (dot-and-line). The reference numerals 103d, 103e and 103f denote manual valves.

Usually, the city gas fed from the intermediate pressure pipe 100 passes through the filter where the foreign matters are removed from the gas, and is introduced into the shut-off valve 105. The shut-off valve 105 is normally opened, but when the governor apparatus is troubled, it will be closed. The governor apparatus regulates or adjusts the gas pressure to intermediate pressure (1—3 kgf/cm$^2$) or low pressure (0.015–0.025 kgf/cm$^2$) and supplies it to gas instruments such as a boiler. In the exclusive governor (two dots-and-line), since it is necessary to measure the volume of the used gas, the flowmeter 106 is arranged in the low pressure side to record the volume of the used gas. In the district governor (dot-and-line), since the volume of the used gas is recorded by the flowmeter installed in each home, the governor piping system itself does not include the flowmeter.

Further, it is necessary to inspect such governor piping system at least each three years; when the inspection is performed, the manual valves 103a and 103b are closed and the gas governor apparatus 104 is used.

As explained above, the conventional governor piping system has a disadvantage that a larger space is required for installing the system, since the system includes large number of elements and apparatuses.

Figure 11:
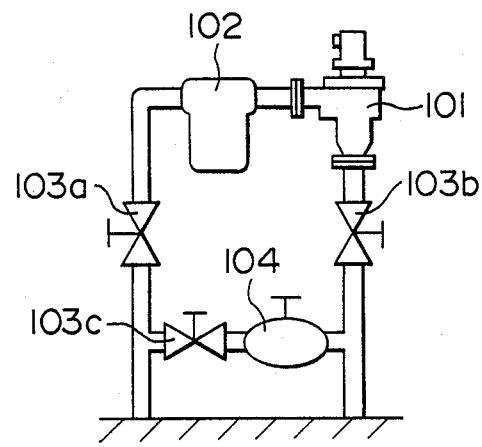
FIG. 11 is a schematic constructional view showing a gas piping system according to the present invention.

On the other hand, a gas governor piping system utilizing the gas governor apparatus according to the present invention is shown in FIG. 11. Since the gas governor apparatus 10 of the present invention has both the shut-off function and the metering function, the gas piping system do not need to include the shut-off valve 105 and flowmeter 106 as shown, thus simplifying the construction of the system, thereby minimizing the installation space thereof.

Figure 12:
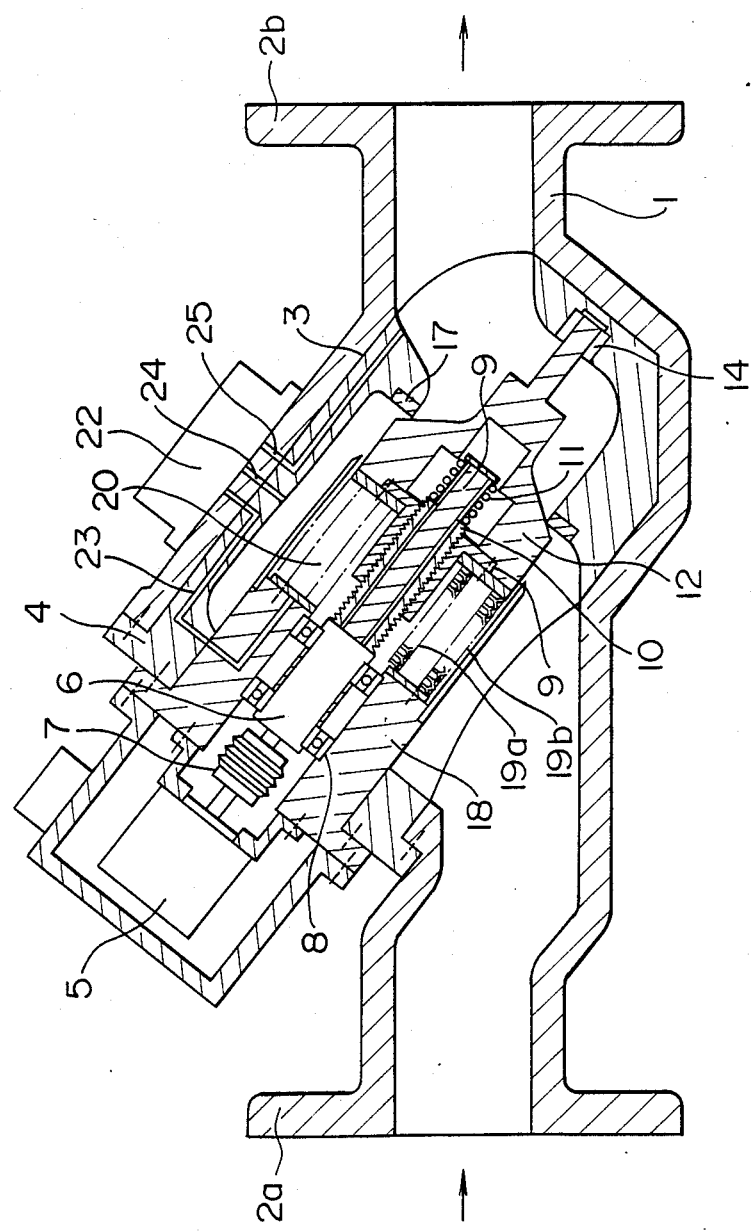
FIG. 12 is a longitudinal sectional view of a gas governor apparatus according to a further embodiment of the present invention.

FIG. 12 shows the other embodiment of the present invention. In the afore-mentioned embodiments, the governor outer casing 1 is formed as L-shaped configuration and the governor inner casing 4 is removably mounted on the outer casing 1. On the other hand, in the embodiment shown in FIG. 12, an opening 3 is formed on the side of a substantially straight governor outer casing 1 through which a governor inner casing 4 is obliquely mounted on the side of the outer casing 1. Of course, a valve body 12 and a driving mechanism including a drive motor 5, drive shaft 6 and the like are integrally mounted on the inner casing 4 so that, when the inner casing 4 is removed from the outer casing 1, the valve body 12 and the diving mechanism are also detached from the outer casing 1 to facilitate the maintenance and/or inspection of the apparatus. In such a construction, a pressure switching valve 22 is arranged on the inclined outer surface of the outer casing 1, and a pressure communication passage 23, primary pressure communication passage 24 and secondary pressure communication passage 25 extend from the pressure switching valve 22 to an intermediate pressure chamber 20. And, the other constructural features are substantially the same as those of the previous embodiments.

With this construction, the same technical advantages as those of the previous embodiments can be obtained, and this construction is particularly advantageous when the apparatus is arranged in the straight portion of the piping system.

As mentioned above, according to the gas governor apparatus and the gas piping system according to the embodiments of the present invention, since the inner casing is removably mounted on the outer casing fixed to the piping structure to form the removable sealed dual construction, only by removing the inner casing from the outer casing, the valve body and the driving mechanism are also detached from the outer casing together with the inner casing, thus facilitating the maintenance and/or inspection of the valve body and the driving mechanism. Further, since the driving mechanism for driving the valve body to cooperate with the valve seat for controlling the pressure or flow rate of the fluid therebetween is constituted by the drive motor and the drive shaft, and the drive shaft has a dual sleeve construction wherein the valve body and the outer sleeve are constituted as the rotating drive mechanism and the outer and inner sleeves are constituted as the axial shifting drive mechanism, and the outer and inner sleeves are axially shiftable relative to each other by means of the elastic member, and the valve body and the inner casing are maintained sealingly by the dual expansible members, and the flow passages are defined by the expansible members and the inner casing, and the intermediate pressure chamber can be switched to communicate with the primary pressure circuit or with the secondary pressure circuit by means of the three-way switching valve to permit the introduction of the fluid pressure into the intermediate pressure chamber, even when the valve body cannot be driven, the flow passage can be safely and quickly shut off by switching the pressure in the intermediate pressure chamber, thus controlling the fluid pressure with high accuracy at high speed. Further, since the fluid pressure acting on the valve body are balanced, the power consumption in the driving mechanism can be minimized. In addition, since the governor apparatus itself has both the shut-off function for shutting off the flow passage when the governor apparatus is troubled and the metering function for recording the volume of the used gas, it is not needed to provide additional shut-off valve and flowmeter, thereby reducing the installation space for the apparatus. Thus, the present invention has numerous advantages.

What is claimed is:

1. A gas governor apparatus comprising:
   an outer casing fixed to a piping structure;
   an inner casing received into said outer casing;
   a valve body slidably supported by said inner casing for controlling pressure and flow rate of fluid between said valve body and a valve seat provided in said inner casing;
   a drive mechanism including a drive shaft for driving said valve body, and a drive motor connected to said drive shaft through a coupling;
   a ball bearing means for supporting the drive shaft;
   bearing case means for receiving said ball bearing means and covering an opening of said outer casing; and
   wherein said drive motor is arranged above said bearing case means, and said outer casing is formed of a generally L-shaped configuration and is provided at its upper end with an opening for mounting said inner casing therein.

2. A gas governor and apparatus according to claim 1, wherein dual expansible members are attached between said bearing case means and said valve body, and one of primary pressure in a fluid introduction side and secondary pressure in a fluid discharge side is introduced into an intermediate chamber defined between said dual expansible members by switching a switching valve.

3. A gas governor apparatus comprising an outer casing fixed to a piping structure; an inner casing received into said outer casing; a valve body slidably supported by said inner casing, for controlling pressure and flow rate of fluid between said valve body and a valve seat provided in said inner casing; and a driving mechanism for driving said valve body, wherein:
   said driving mechanism comprises a drive motor and a drive shaft, said drive shaft having a dual drive sleeve construction where an outer drive sleeve and said valve body are constituted as a rotating drive mechanism and an inner drive sleeve and said outer drive sleeve are constituted as an axial shifting drive mechanism, said outer and inner drive sleeves being axially shiftable by means of an elastic member, said valve body and said inner casing being maintained sealingly by dual expansible members, a flow passage being defined by said dual expansible member and said inner casing, an intermediate pressure chamber being switched to communicate with one of a primary pressure circuit communicating to primary pressure and a secondary pressure circuit communicating to secondary pressure by means of a three-way switching valve to permit introduction of the fluid into said intermediate pressure chamber.

4. A gas governor apparatus according to claim 3, wherein inert gas is filled in a drive chamber receiving said drive motor sealingly held by said dual expansible members.

5. A gas governor apparatus according to claim 3, further including a communication passage communicating with a drive chamber receiving said drive motor sealingly held by said expansible members, and a switching valve for connecting and disconnecting said communication passage with respect to an external pressure source.

6. A gas governor apparatus according to claim 5, wherein said external pressure source comprises inert gas.

7. A gas governor apparatus comprising:
- a casing fixed to a piping and having an opening therein;
- a bearing case for closing said opening of the casing and for receiving a rotatable drive shaft therein;
- a converting portion for converting rotational movement of said drive shaft into linear movement;
- a valve body connected to said converting portion, for controlling pressure and flow rate of fluid between said valve body and a valve seat provided on an inner surface of said casing;
- expansible members arranged between said valve body and said casing to elastically support said valve body and to define an intermediate pressure chamber; and
- a pressure communication passage for directing the fluid in said piping to said intermediate pressure chamber.

8. A gas governor apparatus comprising:
- a casing fixed to a piping and having an opening therein;
- a bearing case for closing said opening of the casing and for receiving a rotatable drive shaft therein;
- a converting portion for converting rotational movement of said drive shaft into linear movement;
- a valve body connected to said converting portion, for controlling pressure and flow rate of fluid between said valve body and a valve seat provided on an inner surface of said casing;
- expansible members arranged between said valve body and said casing to elastically support said valve body and to define an intermediate pressure chamber;
- a pressure communication passage for directing the fluid in said piping to said intermediate pressure chamber; and
- means for switching the fluid in said piping directed to said intermediate pressure chamber through said pressure communication passage.

9. A gas governor apparatus according to one of the claims 7 or claim 8, wherein the fluid in said piping is directed to said intermediate pressure chamber in such a manner that in a normal operation said valve body is subjected low thrust force in a valve opening direction.

10. A gas governor apparatus according to claim 9, wherein the fluid in said piping is directed to said intermediate pressure chamber in such a manner that, when said valve cannot be driven by said drive shaft, said valve is subjected to thrust force in a valve closing direction.

11. A gas governor apparatus according to one of claims 7 or 8, wherein the fluid in said piping is directed to said intermediate pressure chamber in such a manner that, when said valve cannot be driven by said drive shaft, said valve is subjected to thrust force in a valve closing direction.

* * * * *